United States Patent
Register et al.

(10) Patent No.: US 9,881,310 B2
(45) Date of Patent: Jan. 30, 2018

(54) SYSTEM AND METHOD FOR COLLECTING MARKET RESEARCH DATA

(71) Applicants: Thomas Lee Register, Red Bank, NJ (US); Dionne Trottie-Register, Red Bank, NJ (US); Charmaine Trottie, Red Bank, NJ (US)

(72) Inventors: Thomas Lee Register, Red Bank, NJ (US); Dionne Trottie-Register, Red Bank, NJ (US); Charmaine Trottie, Red Bank, NJ (US)

(*) Notice: Subject to any disclaimer, the term of this patent is extended or adjusted under 35 U.S.C. 154(b) by 372 days.

(21) Appl. No.: 14/563,819

(22) Filed: Dec. 8, 2014

(65) Prior Publication Data

US 2015/0161630 A1    Jun. 11, 2015

Related U.S. Application Data

(60) Provisional application No. 61/913,059, filed on Dec. 6, 2013.

(51) Int. Cl.
    *G06Q 30/02*    (2012.01)
    *A63F 9/24*     (2006.01)
    (Continued)

(52) U.S. Cl.
    CPC ............ *G06Q 30/0203* (2013.01); *A63F 9/12* (2013.01); *A63F 2009/242* (2013.01);
    (Continued)

(58) Field of Classification Search
    CPC .............................. G06Q 30/0203; A63F 9/12
    (Continued)

(56) References Cited

U.S. PATENT DOCUMENTS

| 5,918,211 A * | 6/1999 | Sloane | G06Q 20/20 |
| | | | 705/14.27 |
| 8,989,922 B2 * | 3/2015 | Jones | G05D 1/102 |
| | | | 701/22 |

(Continued)

OTHER PUBLICATIONS

Michael Rohs "Marker-Based Embodied Interaction for Handheld Augmented Reality Games", Journal of Virtual Reality and Broadcasting, vol. 4 (2007), No. 5 (Year: 2007).*

*Primary Examiner* — Anita Coupe
*Assistant Examiner* — Shelby A Turner
(74) *Attorney, Agent, or Firm* — Dunlap Bennett & Ludwig PLLC

(57) ABSTRACT

An eliciting system is provided. The eliciting system may embody a method for collecting market research data by eliciting customer input through an interactive, competitive game format. The eliciting system may provide the game format by including a controllable object, a control unit and a display platform, wherein the display platform provides a plurality of scan codes presented in an eye-catching manner. The control unit provides a user interface and is adapted to remotely control the controllable object as it hovers over the display platform. The controllable object may provide a scanner for reading the plurality of scan codes. Each scan code may provide a market association with a good and/or service. Each market association scanned by the scanner is represented on the user interface, whereby the user of the control unit can view and approve of or disapprove of it, while the user controls the controllable object hovering over the display platform.

8 Claims, 2 Drawing Sheets

(51) Int. Cl.
A63H 33/42 (2006.01)
A63H 30/00 (2006.01)
A63F 9/12 (2006.01)

(52) U.S. Cl.
CPC ....... *A63F 2250/22* (2013.01); *A63F 2250/52* (2013.01); *A63H 30/00* (2013.01); *A63H 33/42* (2013.01)

(58) Field of Classification Search
USPC ...................................................... 705/7.32
See application file for complete search history.

(56) References Cited

U.S. PATENT DOCUMENTS

2011/0299732 A1* 12/2011 Jonchery ............... A63H 27/12
382/103
2013/0288781 A1* 10/2013 Kofman ............... G07F 17/323
463/25
2013/0300061 A1* 11/2013 Ben Ezra ............... A63H 33/42
273/157 R

* cited by examiner

SYSTEM AND METHOD FOR COLLECTING MARKET RESEARCH DATA

CROSS-REFERENCE TO RELATED APPLICATION

This application claims the benefit of priority of U.S. provisional application No. 61913059, filed 6 Dec. 2013, the contents of which are herein incorporated by reference.

BACKGROUND OF THE INVENTION

The present invention relates to systems and methods for the collection of market research data and, more particularly, to a method for eliciting customer input regarding goods and services through an interactive, competitive game.

The consuming public is exposed to numerous marketing campaigns attempting to shape their preferences. The most obvious attempts involve mass media advertising. However, important information regarding consumer preferences is also conveyed through interactive and/or competitive game playing. Specifically, in a non-threatening competitive format, such as a game, a player/consumer is more likely to express instinctual preferences. These instinctual preferences, if captured, can be used to as building blocks by advertisers and marketers to define a plurality of consumer preference profiles.

Board games offer such non-threatening competitive formats. For today's digital and virtual savvy consumers, such games are interactive online/video games. However, incorporating the interactive feel of said interactive online/video games into a physically present gameboard can elevate the instinctual effect on players/consumers as well as grab the interest of a passerby.

As can be seen, there is a need for a method for eliciting customer input regarding goods and services through an interactive, competitive game.

SUMMARY OF THE INVENTION

In one aspect of the present invention, a method for eliciting the preferences of a user exposed to a plurality of interactive market associations comprises: providing a display platform comprising a plurality of scan codes, wherein each scan code provides a readable market association; providing a controllable object configured to controllably hover over the display platform; disposing a scanner on the controllable object, wherein the scanner is configured to read each scan code; providing a control unit configured to remotely control the controllable object, wherein the control unit provides a user interface; electronically interconnecting the scanner and the user interface; and configuring the control unit to capture the user's preference for each market association electronically represented on the user interface.

In another aspect of the present invention, a system for eliciting the preferences of a user exposed to a plurality of interactive market associations comprises: a display platform comprising a plurality of scan codes, wherein each scan code provides a readable market association; at least one controllable object configured to controllably hover over the display platform; a scanner disposed on the controllable object, wherein the scanner is configured to read each sufficiently nearby scan code; and a control unit configured to remotely control the controllable object, wherein the control unit provides a user interface configured to present electronic representations of input, wherein the user interface is electronically interconnected to the scanner to receive output thereof as input, and wherein the user interface is configured to capture the user's preference for each market association electronically represented thereon.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an eliciting system embodying a method for collecting market research data by eliciting customer input through an interactive, competitive game format. The eliciting system may provide the game format by including a controllable object, a control unit and a display platform, wherein the display platform provides a plurality of scan codes presented in an eye-catching manner. The control unit provides a user interface and is adapted to remotely control the controllable object as it hovers over the display platform. The controllable object may provide a scanner for reading the plurality of scan codes. Each scan code may provide a market association with a good and/or service. Each market association scanned by the scanner is represented on the user interface, whereby the user of the control unit can view and approve of or disapprove of it, while the user controls the controllable object hovering over the display platform.

Figure 1:
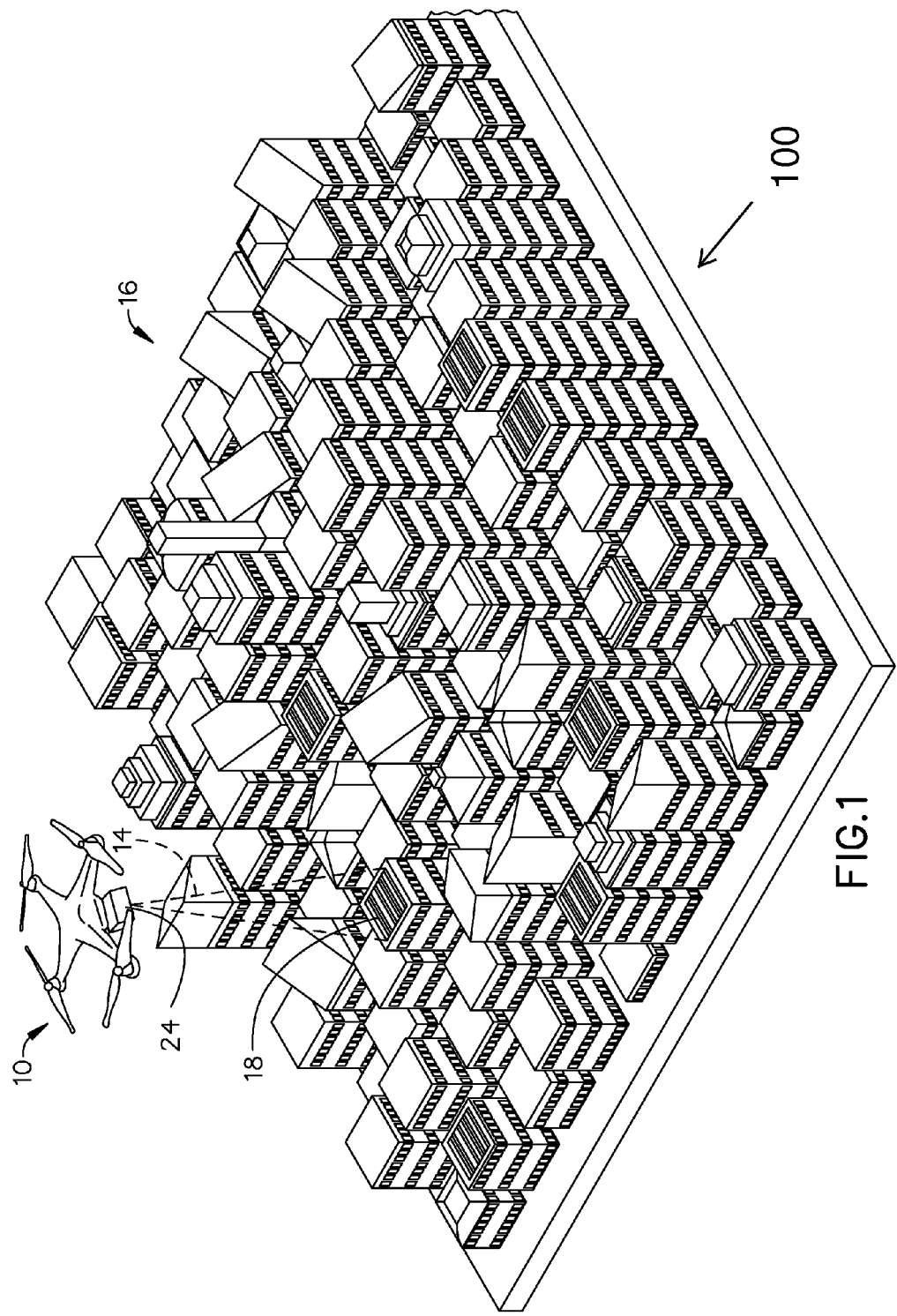
FIG. 1 is a perspective view of an exemplary embodiment of the present invention shown in use.
Figure 2:
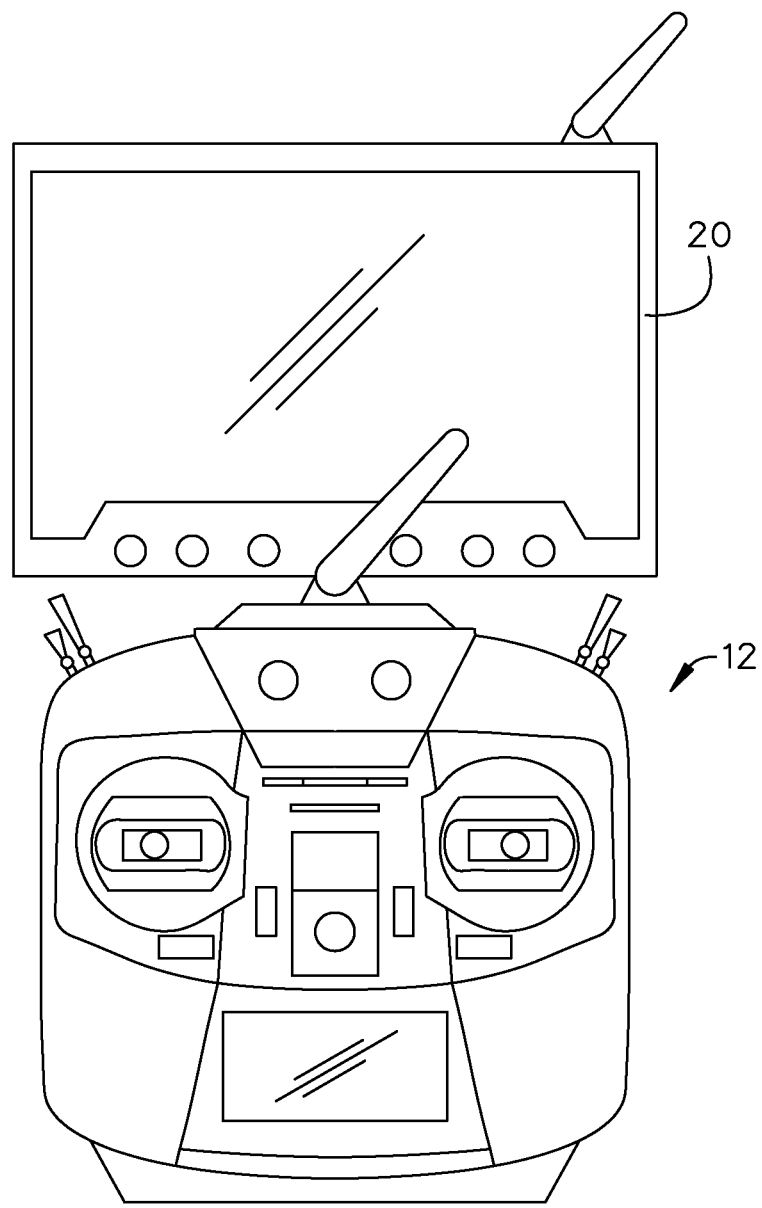
FIG. 2 is a perspective view of an exemplary embodiment of the present invention shown in use.

Referring to FIGS. 1 and 2, the present invention may include an eliciting system 100 embodying a method for collecting market research data by eliciting customer input to through an interactive, competitive game format.

The eliciting system 100 may include a controllable object 10, a control unit 12 and a display platform 16. The display platform 16 may be adapted to provide a plurality of scan codes 18 in an eye-catching manner. For example, the display platform 16 may model a recognizable or novel cityscape, wherein the cityscape provides model city buildings and skyscrapers, some of which have a scan code disposed thereon, as illustrated in FIG. 1. Each scan code 18 may provide a scanner-readable market association with a good and/or service. The market association may be a coupon, a promotion, an advertisement and/or a redeemable reward adapted to create an association in the mind of a viewer with the source of the good and/or service.

The controllable object 10 may provide a scanner 24. The scanner 24 may be adapted to utilize a reading beam 14 for the reading of the scan codes 18 so as to view each market association. The controllable object 10 may be a flying object, such as a helicopter, hot air balloon, airplane, and the like, that can be remotely controlled to controllably hover over the display platform 16.

Referring to FIG. 2, the controllable object 10 may be electronically connected the control unit 12 so that control mechanisms provided by the control unit may be adapted to remotely control the controllable object. The control unit 12 may provide a user interface 20 that may be adapted to present electronic representations of data, including visual data captured by a video camera provided by the controllable object 10 and/or the market association captured by the scanner 24 of the controllable object 10. The user interface 20 may generate a menu option for a user of the control unit 12 to rate, select or otherwise approve of each market association represented on the user interface 20. The control unit 12 may provide a form of electronic memory for retrievably storing such ratings, selections, and/or approval of the plurality of market associations.

A method of using the present invention may include the following. The eliciting system 100 disclosed above may be provided. A user of the control unit 12 may remotely control the controllable object 10 as it operably hovers above the display platform 16, as illustrated in FIG. 1. When the reading beam 14 of the scanner 24 disposed on the controllable object 10 reads a scan code 18 on the display platform 16, the market association thereof is represented on the user interface 20. The control unit 12 is adapted so that the user of the control unit 12 may rate, select or otherwise approve of each market association read by the scanner 24, wherein such interactive expressions of preference are retrievably stored by the control unit 12.

A competitive game involving two or more controllable objects 10 and/or an established point scoring format may be employed to increase the flow of competitive juices of the users of the eliciting system 100.

It should be understood, of course, that the foregoing relates to exemplary embodiments of the invention and that modifications may be made without departing from the spirit and scope of the invention as set forth in the following claims.

What is claimed is:

1. A method for eliciting the preferences of a user exposed to a plurality of interactive market associations, comprising:
   providing a display platform comprising a plurality of scan codes, wherein each scan code provides a readable market association;
   providing a controllable object configured to controllably hover over the display platform;
   disposing a scanner on the controllable object, wherein the scanner is configured to read each scan code;
   providing a control unit configured to remotely control the controllable object, wherein the control unit provides a user interface;
   electronically interconnecting the scanner and the user interface; and
   configuring the control unit to capture the user's preference for each market association electronically represented on the user interface, wherein the control unit prompts the user to approve each user's preference read by the scanner as the controllable object hovers over the display platform for eliciting a preference at the time of hovering the controllable object over the display platform.

2. The method of claim 1, wherein the display platform defines a cityscape and the plurality of scan codes are operably disposed on a portion of model buildings of the cityscape.

3. The method of claim 1, wherein the controllable object is a flying object.

4. The method of claim 1, wherein the scanner provides a reading beam for the reading of the scan codes.

5. The method of claim 1, wherein the user interface is configured to receive the user's preferences.

6. A system for eliciting the preferences of a user exposed to a plurality of interactive market associations, comprising:
   a display platform comprising a plurality of scan codes, wherein each scan code provides a readable market association;
   at least one controllable object configured to controllably hover over the display platform;
   a scanner disposed on the controllable object, wherein the scanner is configured to read each sufficiently nearby scan code; and
   a control unit configured to remotely control the controllable object, wherein the control unit provides a user interface configured to present electronic representations of input, wherein the user interface is electronically interconnected to the scanner to receive output thereof as input, and wherein the user interface is configured to capture the user's preference for each market association electronically represented thereon, wherein the control unit prompts the user to approve each user's preference read by the scanner as the controllable object hovers over the display platform for eliciting a preference at the time of hovering the controllable object over the display platform.

7. The system of claim 6, further including an established point scoring format.

8. The system of claim 6, wherein the display platform defines a cityscape and the plurality of scan codes are operably disposed on a portion of model buildings of the cityscape.

* * * * *